United States Patent
Robinson

(10) Patent No.: US 12,242,885 B2
(45) Date of Patent: Mar. 4, 2025

(54) PROGRAMMABLE HARDWARE PROXY FOR ASSESSMENT OF CONTROL LOGIC

(71) Applicant: McKesson Corporation, Irving, TX (US)

(72) Inventor: Philip Robinson, Norristown, PA (US)

(73) Assignee: McKesson Corporation, Irving, TX (US)

( * ) Notice: Subject to any disclaimer, the term of this patent is extended or adjusted under 35 U.S.C. 154(b) by 520 days.

(21) Appl. No.: 17/710,357

(22) Filed: Mar. 31, 2022

(65) Prior Publication Data

US 2023/0315513 A1    Oct. 5, 2023

(51) Int. Cl.
*G06F 9/48*    (2006.01)
(52) U.S. Cl.
CPC .................................. *G06F 9/4843* (2013.01)
(58) Field of Classification Search
None
See application file for complete search history.

(56) References Cited

U.S. PATENT DOCUMENTS

2015/0309493 A1*  10/2015  Patel .................. H04L 12/2803
                                                              700/275

* cited by examiner

*Primary Examiner* — Adam Lee
(74) *Attorney, Agent, or Firm* — Ballard Spahr LLP

(57) ABSTRACT

Technologies are provided for a programmable hardware proxy (PHP) for assessment of control logic. A control sequence that controls execution of an automation task within a physical automation system can be accessed to generate a virtual representation of physical control connections among sensor devices and a control device associated with an automation subsystem. The virtual representation constitutes a realistic virtual control interface that can be exposed to the automation subsystem in virtual domain. The virtual control interface can replace the control device in virtual domain, while preserving the functionality of the control device. The virtual control interface constitutes the PHP for the sensors devices and the control device. The PHP can be used to assess control logic for the automation subsystem, without reliance on hardware present in the automation subsystems.

20 Claims, 8 Drawing Sheets

PROGRAMMABLE HARDWARE PROXY FOR ASSESSMENT OF CONTROL LOGIC

SUMMARY

It is to be understood that both the following general description and the following detailed description are illustrative and explanatory only and are not restrictive.

In one embodiment, the disclosure provides a computing system. The computing system includes at least one processor; and at least one memory device having processor-executable instructions stored thereon that, in response to execution by the at least one processor, cause the computing system to access a control sequence that directs execution of an automation task involving an automation system and one or more sensor devices functionally coupled to an automation subsystem of the automation system. The processor-executable instructions, in response to execution by the at least one processor, also cause the computing system to generate, based on the control sequence, respective virtual connections for the one or more sensor devices. The processor-executable instructions, in response to execution, further cause the computing system to generate first data by executing the control sequence. The first data represents output signal from at least one sensor device of the one or more sensor devices. The processor-executable instructions, in response to execution, still further cause the computing system to pass the first data to a second control sequence that directs operation of the automation subsystem.

In another embodiment, the disclosure provides a computer-implemented method. The computer-implemented method includes accessing a control sequence that directs execution of an automation task involving an automation system and one or more sensor devices functionally coupled to an automation subsystem of the automation system. The computer-implemented method also includes generating, based on the control sequence, respective virtual connections for the one or more sensor devices. The computer-implemented method further includes generating first data by executing the control sequence. The first data represents output signal from at least one sensor device of the one or more sensor devices. The computer-implemented method still further includes passing the first data to a second control sequence that directs operation of the automation subsystem.

In yet another embodiment, the disclosure provides a computer-program product. The computer-program product includes at least one computer-readable non-transitory storage medium having processor-executable instructions stored thereon that, in response to execution, cause a computing system to access a control sequence that directs execution of an automation task involving an automation system and one or more sensor devices functionally coupled to an automation subsystem of the automation system. The processor-executable instructions, in response to execution, also cause the computing system to generate, based on the control sequence, respective virtual connections for the one or more sensor devices. The processor-executable instructions, in response to execution, further cause the computing system to generate first data by executing the control sequence. The first data represents output signal from at least one sensor device of the one or more sensor devices. The processor-executable instructions, in response to execution, still further cause the computing system to pass the first data to a second control sequence that directs operation of the automation subsystem.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

DETAILED DESCRIPTION

The disclosure recognizes and addresses, among other technical challenges, the issue of development of control software for an automation system. Such a development may be difficult without access to the automation system in the field. Access to the physical automation system also is difficult because it may pose a scheduling problem that entails coordination among several parties. Even when the physical automation system is available, assessing control software in that automation system involves production downtime and other inefficiencies. Embodiments of this disclosure provide computing systems, computing devices, computer-implemented methods, and computer program products that, individually or in combination, can provide a programmable hardware proxy for a physical automation system. The PHP can be used for development of control software.

As is described in greater detail below, embodiments of the disclosure can generate a virtual representation of physical control connections among sensor devices and control devices within the physical automation system. Such a virtual representation can constitute a realistic virtual control interface that can be exposed to an automation subsystem in virtual domain. The automated subsystem can be embodied in a conveyance subsystem, for example. That virtual control interface can replace a control device while preserving the functionality of that control device in virtual domain. The virtual control interface can thus be used for evaluation of control logic for the automation subsystem within the physical automation system, without reliance on hardware present in those automation subsystems.

By providing a realistic virtual control interface that can be exposed to an emulated automation subsystem, for example, embodiments of this disclosure eliminate the need for expensive, and oftentimes unavailable, hardware to assess control logic. As a result, embodiments of this disclosure render the development of control software more efficient, dramatically reducing the time between development and production at the physical automation system.

Although embodiments of this disclosure are described with reference to conveyance subsystems, the disclosure is not limited in that respect. Indeed, the principles and practical applications of this disclosure also can be implemented for other types of automation subsystems directed by control devices according to defined control logic. For example, those other types of automation subsystems include any automation equipment (e.g., auto-bagger equipment) that provides status to a control device via programmable logic control (PLC) connection points.

Figure 1A:
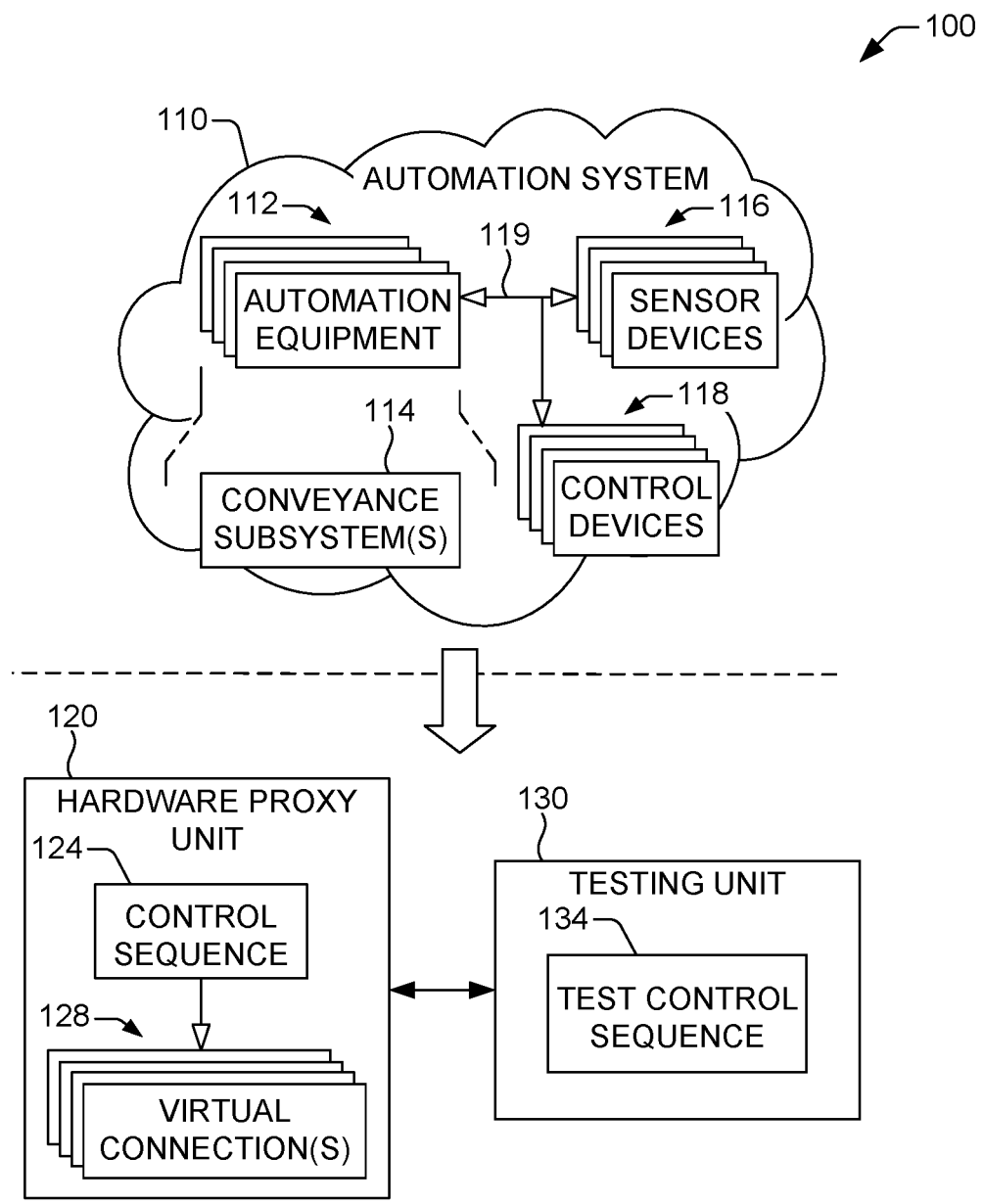
FIG. 1A illustrates an example of an operating environment for assessment of control logic using a programmable hardware proxy (PHP), in accordance with one or more embodiments of this disclosure.

FIG. 1A schematically illustrates an example of an operating environment 100 for a programmable hardware proxy for an automation system 110, in accordance with one or more embodiments of this disclosure. The operating environment 100 includes a physical domain embodied in the automation system 110. The automation system 110 includes automation equipment 112, sensor devices 116, and control devices 118. At least some of the automation equipment 112 constitutes one or multiple conveyance subsystems 114. The automation equipment 112 can include, for example, dispensing equipment (e.g., hoppers and/or tanks), vibratory motors, mesh screens, printing devices, diverter devices, a combination of the foregoing, or similar equipment. The sensor devices 116 can include, for example, camera devices, weight scales, radio-frequency identification (RFID) reader devices, label reader devices (e.g., barcode scanners and QR-code scanners), photodetector devices, a combination of the foregoing, or similar devices. Each one of the conveyance subsystem(s) 114 can include, for example, frames, drive rollers, idle rollers, and/or belts assembled in a particular configuration to carry objects along a transportation pathway. Examples of a conveyance subsystem include belt conveyors and powered roller conveyors.

One or multiple first control devices of the control devices 118 can direct the operation of the conveyance subsystems 114 according to first control logic. One or multiple second control devices of the control devices 118 can direct, according to second control logic, the operation of the automation equipment 112 that excludes the conveyance subsystem(s) 114. Regardless of type of automation equipment, control logic can be embodied in, or can constitute, software retained in one or multiple memory devices. The software can be referred to as control software, and can include a sequence of instructions that, individually or in combination, can direct the operation of the automation equipment—the automation equipment 112 or the conveyance subsystem(s) 114, for example. The sequence of instructions can be referred to as a control sequence.

A control sequence can be executed by a processor or another type of processing circuitry. In some cases, the control sequence can be built, resulting in executable program code. In other cases, instead of creating executable program code, the control sequence can be compiled and interpreted, and then executed. Instructions in the control sequence are specific to a programming language to direct the execution of an automation by controlling the operation of automation devices. The programming language can be one of a high-level language, such as Java™, Perl, Python, Delphi, Microsoft® Visual Basic, C #, C++, ladder logic, sequential function chart, or the like; device or controller code language, such as Verilog, instruction list, or structured text; assembly code; or the like.

The automation system 110 also includes a bus architecture 119 that permits the communication of data and/or signaling between two or more elements of the automation system 110. Communication of data and signaling can include the exchange of the data and/or signaling between two elements; the transmission of the data and/or signaling from one element to another element; and the reception of the data and/or signaling by one element from another element. The bus architecture 119 can transport data and/or signaling according to a communication protocol (or bus protocol). Examples of the communication protocol include Ethernet-based industrial bus protocol, controller area network (CAN) bus protocol, Modbus, Profibus, and other types of fieldbus protocols.

The operating environment 100 also includes a virtual domain corresponding to at least a portion of the automation system 110. The virtual domain can be hosted, at least in part, by a computing apparatus or a system of computing apparatuses. The virtual domain includes a hardware proxy unit 120 and a testing unit 130. The hardware proxy unit 120 can virtualize a portion of the automation equipment 112 based on a control sequence 124 that, when executed, causes the portion of the automation equipment 112 to perform an automation task. The portion of the automation equipment 112 includes at least one of the conveyance subsystem(s) 114. The control sequence 124 can specify one or multiple first sensor devices of the sensor devices 116. In physical domain, the first sensor device(s) can generate data indicative of values of respective process variables corresponding to the automation task. In virtual domain, execution of the control sequence 124 can traverse a set of multiple instructions and corresponding values of process variables for the first sensor device(s). The set of multiple instructions and values define a particular automation scenario where the automation task is accomplished. In other words, execution of the control sequence 124 can simulate the performance of the automation task under particular conditions. In an example scenario where the automation system 110 is embodied in an automated dispensing pharmacy, the automation task can include automated fulfillment of prescriptions, including the automated packing of medications and/or medical supplies (e.g., syringes, lancets, a lancing device, a sharps disposal container, or similar supplies).

To virtualize the portion of the automation equipment 112, the hardware proxy unit 120 can generate, based on the control sequence 124, one or more virtual connections 128 corresponding to the one or multiple first sensor devices. Such a correspondence can be a one-to-one correspondence. Thus, a virtual connection can be configured for each one of the first sensor device(s), resulting in the configuration of virtual connection(s) 128. The control sequence 124 can include one or more statements defining the first sensor device(s). One such statement can be referred to as a declaration. In one example, multiple statements can declare respective first sensor devices. The hardware proxy unit 120 can generate, using such statement(s), the virtual connection(s) 128. The hardware proxy unit 120 can generate a virtual connection by generating a data structure that defines the virtual connection, and storing the data structure within one or multiple memory devices (e.g., a system memory of a computing system). Each one of the virtual connection(s) 128 embodies a virtual representation of a physical control connection that would be present among one of the first sensor device(s) and one of the control devices 118. Accordingly, the virtual connection(s) 128 serve as a proxy for the physical first sensor device(s) within the automation system 110.

In one example, the automation task can be to fill carriers (or containers) with respective groups of items and transport the filled carriers to a sortation stage where some of the carriers are diverted for verification and release, and the remaining carriers are transported to a shipping station. In an automated dispensing pharmacy the items can include medications and/or medical supplies. In a non-medical fulfillment center, the items can include consumer products (electronic or otherwise), for example. In such a scenario the first sensor device(s) can include a barcode reader device, a photodetector device, and a diverter device. Accordingly, the hardware proxy unit 120 can generate a first virtual connection corresponding to the barcode device, a second virtual connection corresponding to the photodetector device, and a third virtual connection corresponding to the diverter device.

The hardware proxy unit 120 is programmable in that the virtual connection(s) 128 that are configured are dictated by the control sequence 124. A particular control sequence 124 and a corresponding configuration of virtual connection(s) 128 constitutes a particular programming of the hardware proxy unit 120. Accordingly, the hardware proxy unit 120 represents a programmable hardware proxy.

For a particular programming, the hardware proxy unit 120 can generate control data by executing the control sequence 124. The control data represents, in virtual domain, output signal from at least one of the first sensor device(s). As mentioned, the first sensor device(s) have been virtualized via the virtual connection(s) 128. Generating the control data can include formatting a first portion of the first data according to a bus protocol. The bus protocol can be any communication protocol used to communicate data between a sensor device and a control device within an automation system that includes the automation equipment.

The hardware proxy unit 120 can expose the virtual connection(s) 128 to a control sequence other than the control sequence 124. That other control sequence can direct the operation of an automation subsystem within the automation system 110 in physical domain. The automation subsystem can be one of the conveyance subsystem(s) 114. By exposing the virtual connection(s) 128, control data can be passed to that other control sequence. In that way, because the control data can be formatted according to a bus protocol, the virtual connection(s) 128 constitute a virtual controller interface that is logically equivalent to a control device that directs the operation of the automation subsystem in physical domain. Passing the control data to the other control sequence can include routing a first portion of the control data to a first virtual connection of the virtual connection(s) 128, and then sending the first portion of the control data to the other control sequence. The first portion of the control data can be sent using an application programming interface (API), for example.

The hardware proxy 120 can be functionally coupled with a testing unit 130 that can execute a test control sequence 134. In response to execution, the test control sequence 134 can emulate the operation of a conveyance subsystem based on data received from the hardware proxy 120. The emulated conveyance subsystem can be part of the portion of the automation system 110 that can be controlled by the control sequence 124. The conveyance subsystem can be one of the conveyance subsystem(s) 114.

Figure 1B:
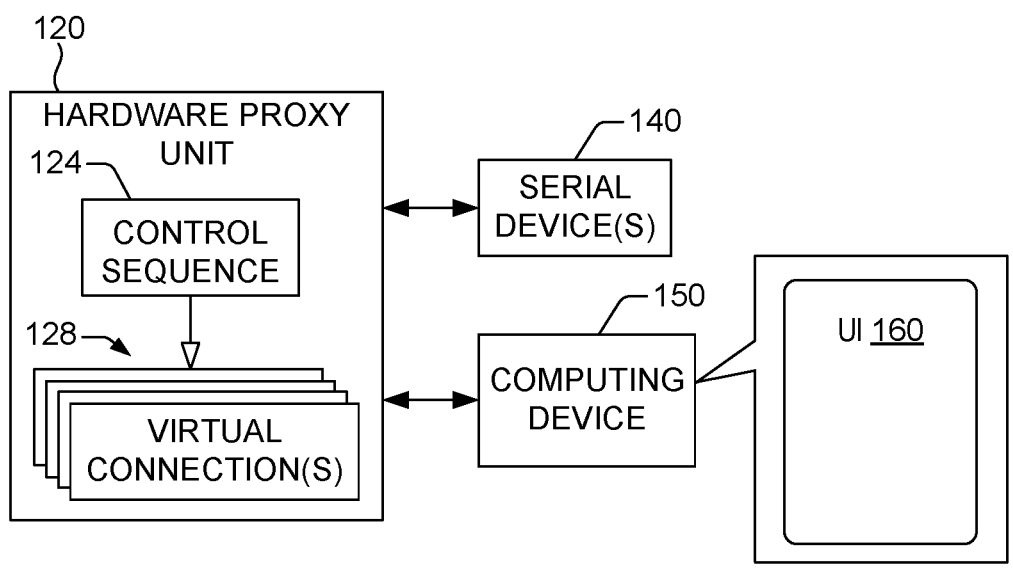
FIG. 1B illustrates an example of another operating environment, in accordance with one or more embodiments of this disclosure.

In physical domain, the first sensor devices corresponding to the virtual connection(s) 128 can supply control data defining values of process variables associated with operation of the conveyance subsystem. In response to execution in virtual domain, the control sequence 124 can generate such control data, and the control data can be passed to the test control sequence 124. As is illustrated in FIG. 1B, the hardware proxy unit 120 can be functionally coupled to a computing device 150 that can present a user interface 160 that permits configuring various attributes of the development and/or evaluation of the test control sequence 134. For example, the user interface 160 can permit receiving, at the computing device 150, input data defining a selection of one or multiple sensor devices included in the sensor devices 116. A display device that is integrated into the computing device or functionally coupled thereto can present the user interface 160. The computing device 150 can present other user interface to visualize results the development and/or testing of the test control sequence 124. As is also illustrated in FIG. 1B, the hardware proxy unit 120 can be functionally coupled to one or more peripheral serial devices 140 via respective serial ports (not depicted in FIG. 1B) that can be integrated into the hardware proxy unit 120.

The test control sequence 134 can receive the control data from at least one of the virtual connection(s) 128 in response to execution of both the control sequence 124 and the test control sequence 134. It is noted that execution of the control sequence 124 and the test control sequence 134 is synchronized due to the manner in which the testing unit 130 can send data to, and receive data from, the hardware proxy unit 120. The testing unit 130 can execute, or can continue executing, the test control sequence 134 to generate second control data using the received control data. In some cases, the second control data can result in a change in operating state of the conveyance subsystem. For example, the second control data can define a particular value of a state variable of the conveyance subsystem. The test control sequence 134 can cause the state variable to transition from a current value to that particular value. The test control sequence 134 can generate a log record of the state variable, indicating the transition from the current value to the particular value. As an example, the state variable can be velocity of a conveyance component, such as linear velocity of a conveyor belt or angular velocity of a drive roller, and the particular value can define a magnitude and a direction of the linear velocity or angular velocity. The test control sequence 130 can change a current velocity (e.g., 0 m/s; conveyor belt at rest) to another velocity having that defined magnitude and defined direction.

Continued execution of both the control sequence 124 and the test control sequence 134 can generate control data defining values of one or multiple state variables of the conveyance subsystem during performance of an automation task. The control data can be used for evaluation of the test control sequence 134. The hardware proxy unit 120 can evaluate the test control sequence 134 in numerous ways by applying one or more tests, or another type of evaluation logic, to the control data. Such test(s) and evaluation logic can be configurable, and can be specific to the control sequence 124 or the test control sequence 134, or both. For example, the control data that have been generated can form a time series of the state variable(s). That time series can be evaluated to determine if the execution of the automation task is satisfactory—e.g., absence of carrier congestion, adequate yield of transported carriers, and so forth. As another example, the hardware proxy unit 120 can evaluate a given command to divert a carrier and, based on the evaluation, can determine that the command cannot be carried out because of congestion at a destination of the carrier to be diverted. As part of the evaluation logic, the hardware proxy unit 120 can generate a message indicating no action taken, such as "No Confirm Divert Pulse" instead of "Confirm Divert Pulse." In other cases, instead of evaluating the test control sequence 134, the hardware proxy unit 120 can cause or otherwise direct a computing device to evaluate the test control sequence 134.

Because the hardware proxy unit 120 virtualizes physical sensor devices involved in the automation task, the test control sequence 124 can be evaluated without reliance on hardware associated with the conveyance subsystem. Accordingly, development of the test control sequence 134 can be accomplished entirely in virtual domain, using realistic test scenarios in terms of instrumentation and automation equipment.

Figure 2:
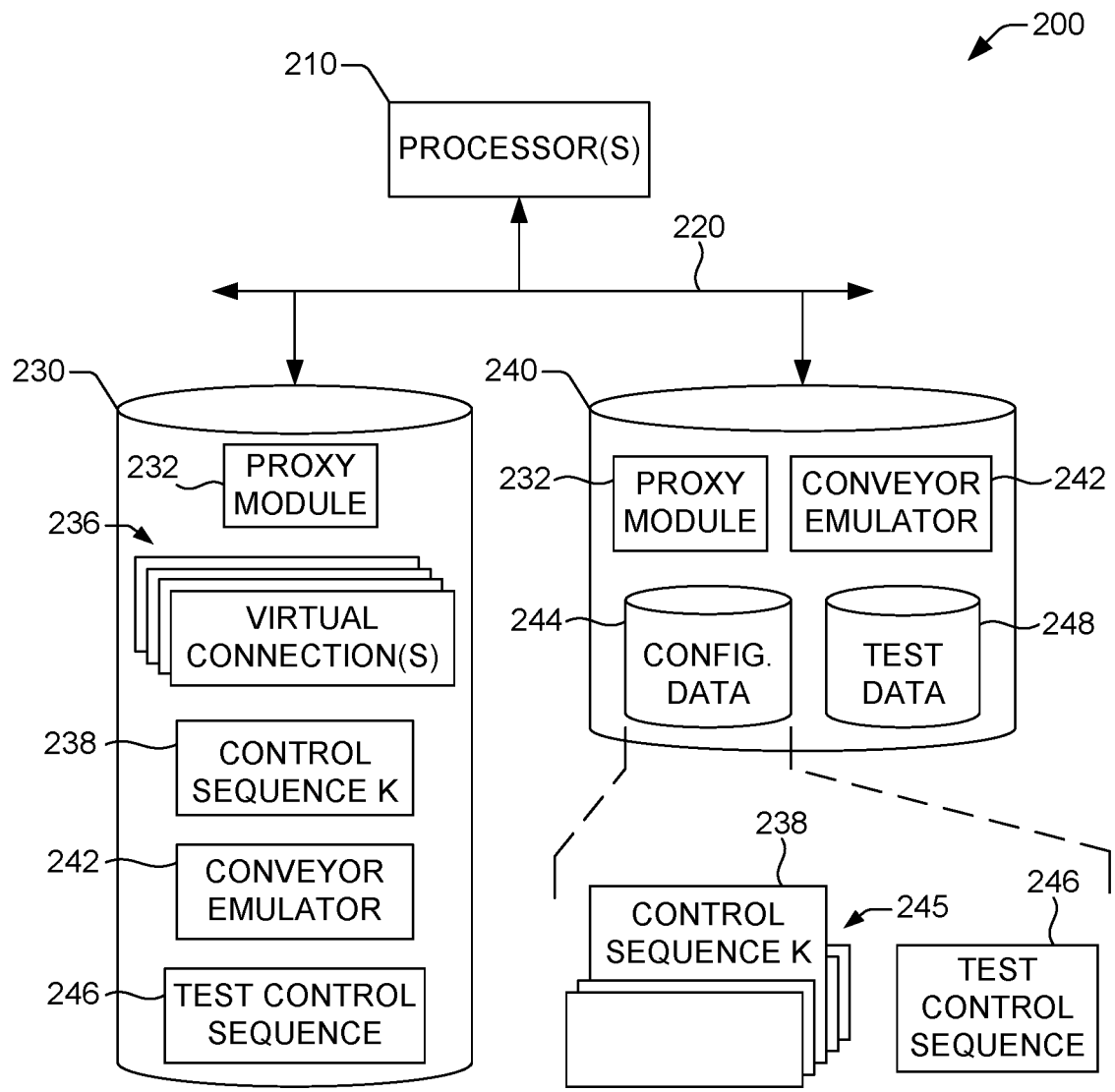
FIG. 2 illustrates an example of a computing system for assessment of control logic using a PHP, in accordance with one or more embodiments of this disclosure.

FIG. 2 is a schematic block diagram of a computing system 200 for evaluation of control logic using a PHP, in accordance with one or more embodiments of this disclosure. The computing system 200 includes one or multiple processors 210. Each one of the processor(s) 210 can have at least one processing core. The processor(s) 210 can be assembled in a single chipset or can be distributed over many computing chipsets. The processor(s) 210 can constitute a central processing unit (CPU). In other cases, the processor(s) 210 can constitute a graphical processing unit (GPU) or a tensor processing unit (TPU). In yet other cases, the processor(s) 210 can constitute a combination of CPU(s), GPU(s), and/or TPU(s).

The computing system 200 also includes a bus architecture 220 that can mutually functionally couple the processor(s) 210, one or multiple memory devices 230, and one or multiple non-volatile memory devices 240. The memory device(s) 230 can include, for example, a combination of volatile memory device(s) and non-volatile memory device(s). The memory device(s) 230 can be referred to as system memory 230. The non-volatile memory device(s) 240 can be referred to as mass storage 240.

The computing system 200 can include a hardware proxy module 234 retained in mass storage 240. The hardware proxy module 234 can be embodied in machine-accessible components (e.g., processor-readable and/or processor-executable components). Machine-accessible instructions (e.g., processor-readable and/or processor-executable instructions) embody or otherwise constitute each one of such machine-accessible components. The machine-accessible instructions are encoded in the mass storage 240, and can be built (e.g., linked and compiled) and retained in processor-executable form in the mass storage 240 or in one or many other machine-accessible non-transitory storage media.

The processor(s) 210 can execute the hardware proxy module 234 to configure one or more virtual connections 236. To that end, the processor(s) 210 can load the hardware proxy module 234 onto the system memory 230 and can execute the processor-executable components that form the hardware proxy module 234. In response to execution, the hardware proxy module 234 can access a control sequence K 238 from the mass storage 240, and can then use the control sequence K 238 to configure the virtual connection(s) 236.

The mass storage 240 can store configuration data 244 including multiple control sequences 245. Accessing the control sequence K 238 includes loading a portion of the configuration data 245 onto the system memory 230, where that portion of data defines the control sequence K 238. The configuration data 245 also can include data that identifies the control sequence to be accessed by the hardware proxy module 232. In some cases, the configuration data 244 can be embodied in multiple configuration files. A first configuration file of the multiple configuration files can identify the control sequence to be accessed by the hardware proxy module 232. Other configuration files of the multiple configuration files can define respective control sequences. A particular configuration file can contain data defining the control sequence K 238. Thus, accessing the control sequence K 238 includes loading the data present in that particular configuration file onto the system memory 230.

In some cases, the computing system 200 can include, or can be functionally coupled to, a configuration module (not depicted in FIG. 2) that can supply the configuration data 245. In one example, the configuration module can cause presentation of a user interface that can receive input data defining a control sequence and/or other input data identifying the control sequence to be accessed by the hardware proxy module 232.

A combination of the hardware proxy module 232 in execution, configured virtual connection(s) 236, and the control sequence K 238 loaded onto the system memory 230 can embody, or can constitute, an instance of the hardware proxy unit 120 (FIG. 1A). Accordingly concurrent instances of execution of the hardware proxy module 232 in combination with respective control sequences and respective configured virtual connection(s) can embody multiple instances of the hardware proxy unit 120 (FIG. 1A). Each one of those instances can be referred to as a PHP instance.

Figure 3:
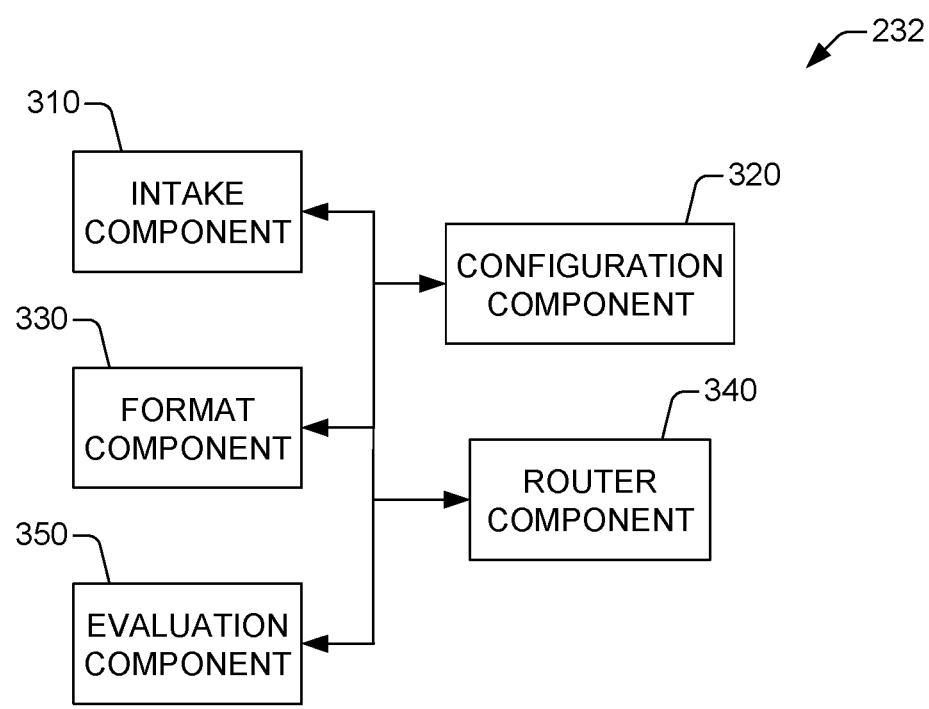
FIG. 3 illustrates an example of an architecture of a proxy module that constitutes a PHP, in accordance with one or more embodiments of this disclosure.

In some embodiments, as is illustrated in FIG. 3, the hardware proxy module 234 can include an intake component 310 that, in response to execution, can access data from the configuration data 244. The hardware proxy module 232 also can include a configuration component 320 that can generate virtual connections based on a control sequence. The configuration component 320 generate, using the control sequence K 238, the virtual connection(s) 236.

With further reference to FIG. 2, the computing system 200 also can include a conveyor emulator module 242 retained in the mass storage 240. The conveyor emulator module 242 also can be embodied in machine-accessible instructions (e.g., processor-readable and/or processor-executable instructions) encoded in the mass storage 240. The machine-accessible instructions can be built (e.g., linked and compiled) and retained in processor-executable form in the mass storage 240 or in one or many other machine-accessible non-transitory storage media.

The processor(s) 210 can execute the conveyor emulator 242 to emulate operation of a conveyance subsystem using control data generated in response to execution of the proxy module 232. To that end, the processor(s) 210 can load the conveyor emulator module 242 and a test control sequence 246 onto the system memory 230. Additionally, the processor(s) 210 can then execute the processor-executable instructions that form the conveyor emulator 242. Execution of the conveyor emulator module 242 includes the execution of the test control sequence 246. Thus, the conveyor emulator 242 in execution can embody, or can constitute, an instance of the testing unit 130 (FIG. 1A).

Execution of the test control sequence 246 (via the conveyor emulator 242) and execution of the control sequence K 238 (via the hardware proxy module 232) can be synchronized in order to expose a control interface to the emulated conveyance subsystem corresponding to the test control sequence 246. The control interface embodies a virtual controller for the conveyance subsystem. Control data can be generated in response to execution of the control sequence K 238, via the hardware proxy module 232. The control data can be formatted according to a defined bus protocol (e.g., Modbus or another type of fieldbus protocol) and can be passed to the test control sequence 246. As is described herein, passing the control data to the test control sequence 246 can include routing a first portion of the control data to a first virtual connection of the virtual connection(s) 236, and then sending the first portion of the control data to the test control sequence 246. The first portion of the control data can be sent using an API, for example. In some embodiments, as is illustrated in FIG. 3, the hardware proxy module 234 can include a format component 330 that, in response to execution, can format control data according to the defined bus protocol. In one example, a first portion of the control data can be formatted as a first message and a second portion of the control data can be formatted as a second message. Each one of the first message and the second message can include multiple fields, each containing payload data. In another example, the defined bus protocol can be Modbus RS-232, and the control data can be formatted in terms of multiple fields, including address, function code, byte count, payload data, cyclic redundancy check (CRC) low, and CRC high. The hardware proxy module 232 also can include a router component 340 that can route formatted control data to each one of the virtual connection(s) 236. To that end, the router component 340 can generate queues of respective portions of formatted control data, each queue directing a portion of formatted control data to a logic address of a virtual connection.

Execution of the test control sequence 246, via the conveyor emulator 242) can generate second control data using the received control data. Execution of the test control sequence 246 also can the second control data within data storage 248 (referred to as test data 248). Execution of the test control sequence 246 can further generate log records indicative of respective control events (such as transition between operating states of the emulated conveyor subsystem). The log records also can be retained within the test data 248.

Continued execution of both the control sequence 238 and the test control sequence 246 can generate additional control data and log records. The control data and log records, individually or in combination, can characterize the performance of the emulated conveyor subsystem during execution of an automation task. Such control data and/or log records can be used for evaluation of the test control sequence 246. In some embodiments, as is illustrated in FIG. 3, the hardware proxy module 232 can include an evaluation component 350 that can evaluate the test control sequence 246 by applying evaluation logic to the control data and/or log records. The evaluation logic can include one or more tests, one or more performance rules, or a combination thereof, for example. Although not depicted in FIG. 2, the evaluation logic can be retained in the memory 240. In some cases, evaluating the test control sequence 246 can include generating a score, based on the control data and/or log records, for the test control sequence 246, and generating a message including the score and sending that message (an email, for example) to a computing device remotely located relative to the computing system 200. In addition, or in other cases, evaluating the test control sequence 246 also can include generating, based on the score, a modification to the test control sequence 246, and implementing the modification or providing a recommendation that the modification be made.

In some cases, instead of applying the evaluation logic, the evaluation component 350 can cause or otherwise direct a computing device to evaluate the test control sequence 246. As part of causing or otherwise directing that other computing device to evaluate the test control sequence 246, the evaluation component 350 can send the control data and/or log records to the computing device. That computing device can be remotely located relative to the computing system 200.

Although not illustrated in FIG. 2, the computing system 200 also can include other types of computing resources that can permit or otherwise facilitate the execution of the machine-accessible components retained in mass storage 240. Those computing resources can include, for example, interface(s) (such as I/O interfaces and network interfaces); controller devices(s); power supplies; and the like. For example, the memory 240 can include programming interface(s) (such as APIs); an operating system; software for configuration and or control of a virtualized environment; firmware; and the like.

The computing system 200 can be assembled into a single computing apparatus (such as a blade server device or another type of server device). In other cases, the computing system 200 can be assembled into multiple computing apparatuses (e.g., multiple blade server devices or other types of server devices). In one example of such a distributed arrangement, each one of the multiple computing apparatuses can include the processor(s) 210, the bus architecture 220, and the system memory 230 and the mass storage 230. A network architecture can permit the communication of data and/or signaling among two or more of the multiple computing apparatuses. The network architecture can include a wireline network and/or a wireless network.

Figure 4:
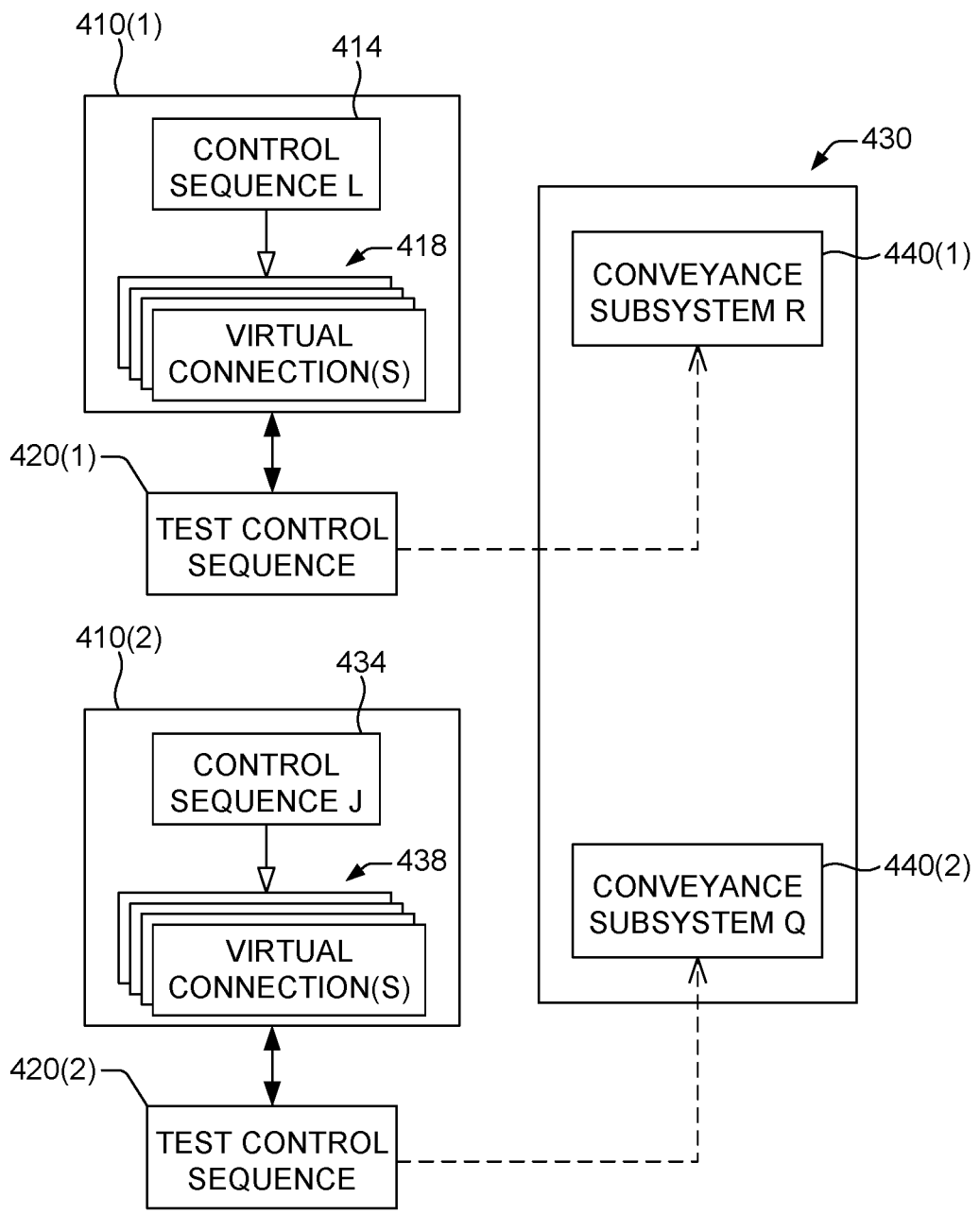
FIG. 4 illustrates an example of multiple PHP instances, in accordance with one or more embodiments of this disclosure.

FIG. 4 illustrates multiple PHP instances that can be used to evaluate control logic for multiple conveyance subsystems, in accordance with one or more embodiments of this disclosure. The multiple conveyance subsystems can form a large conveyance system. Thus, the multiple PHP instances can permit more comprehensive evaluation of control software. The control software that is evaluated can include multiple control sequences.

A first PHP instance 410(1) executes a control sequence L 414 that can control the performance of a first automation task. In one example, the control sequence L 414 is one of the multiple control sequences 245 (FIG. 2). The PHP instance 410(1) configures, based on the control sequence L 414, one or more virtual connections 418. To that end, the PHP instance 410(1) can access one or more statements included in the control sequence L 414, where the statement(s) define respective first sensor devices within an automation system including a conveyance subsystem R 440(1). For example, the automation system can be embodied in the automation system 110 (FIG. 1A), and the conveyance subsystem R 440(1) can be one of the conveyance subsystem(s) 114 (FIG. 1A).

In response to execution of the control sequence L 414, the PHP instance 410(1) can generate control data and can pass that control data to a test control sequence 420(1). The test control sequence 420(1) is configured to direct, in virtual domain, the operation of the conveyance subsystem R 440(1).

Another PHP instance 410(2) executes a control sequence J 434 that can control the performance of a second automation task. In one example, the control sequence J 434 is one of the multiple control sequences 245 (FIG. 2). The PHP instance 410(2) configures, based on the control sequence J 434, one or more virtual connections 438. To that end, the PHP instance 410(2) can access one or more statements included in the control sequence J 434, where the statement(s) define respective first sensor devices within the automation system that includes the conveyance subsystem R 440(1) and the conveyance subsystem Q 440(2). As mentioned, the automation system can be embodied in the automation system 110 (FIG. 1A). The conveyance subsystem Q 440(2) can be one of the conveyance subsystem(s) 114 (FIG. 1A), for example.

In response to execution of the control sequence J 434, the PHP instance 410(2) can generate control data and can pass that control data to a test control sequence 420(2). The test control sequence 420(1) is configured to direct, in virtual domain, the operation of the conveyance subsystem Q 440(2).

The first automation task and the second automation task constitute an automation task that involves, in virtual domain, the operation of the conveyance subsystem R 440(1) and the conveyance subsystem 440(2). The conveyance subsystem R 440(1) and the conveyance subsystem 440(2) can form a conveyance system 430. The test control sequence 420(1) and the test control sequence 420(2) embody control logic that directs the operation of the conveyance system 430 during performance of the automation task. Concurrent, synchronized execution of the control sequence L 414, the test control sequence 420(1), the control sequence J 434, and the test control sequence 420(2) can generate test data that can be used to assess that control logic.

Figure 5:
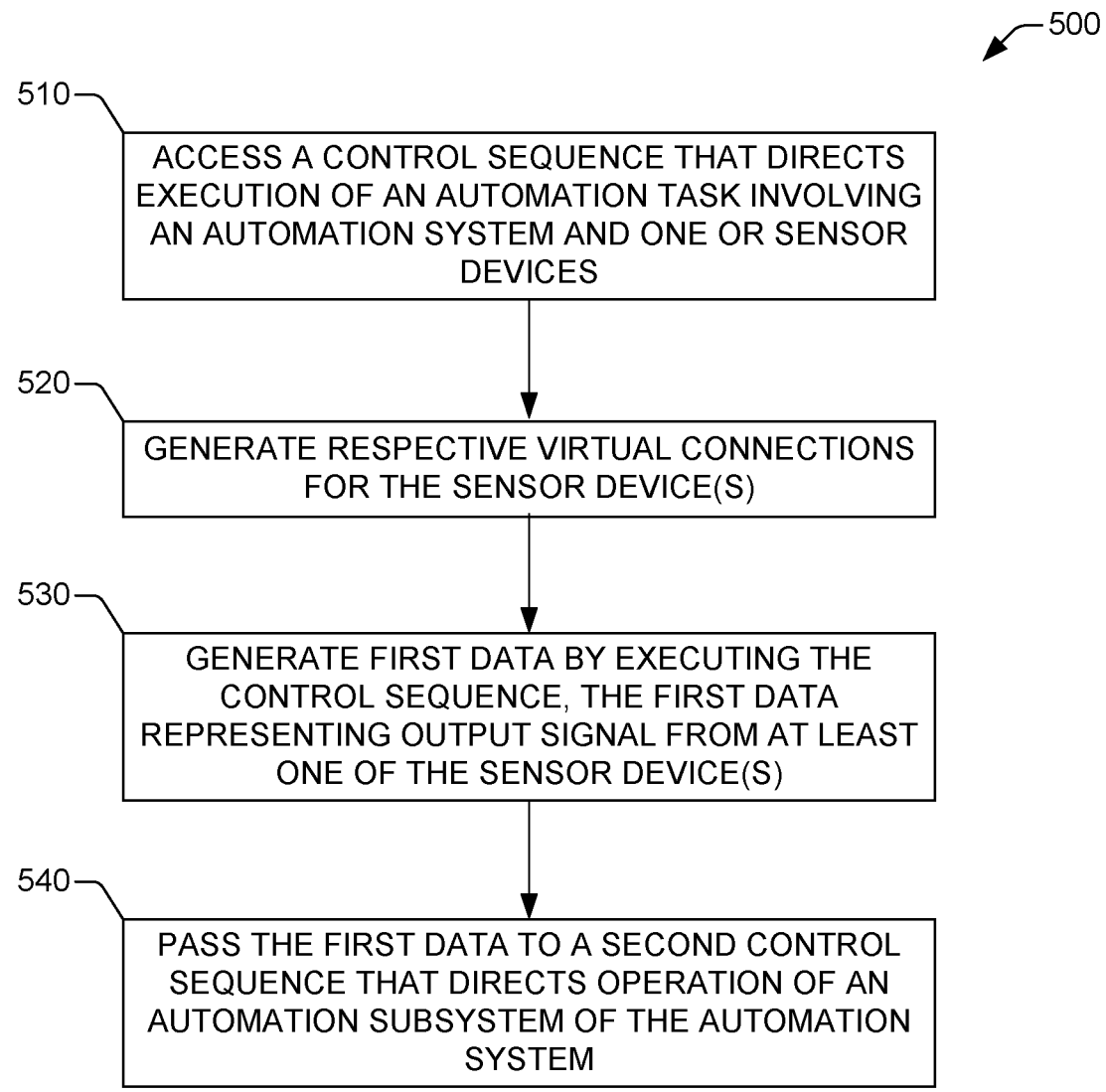
FIG. 5 illustrates an example of a method for providing a PHP for assessment of control logic, in accordance with one or more embodiments of this disclosure.

FIG. 5 illustrates an example of a method 500 for providing a programmable hardware proxy for a physical automation system, in accordance with one or more embodiments of this disclosure. A computing system can perform the example method 500 in its entirety or in part. To that end, the computing system includes computing resources that can implement at least one of the blocks included in the example method 500. The computing resources include, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. For instance, the computing system can include programming interface(s); an operating system; software for configuration and or control of a virtualized environment; firmware; and similar resources. In some cases, the computing system can be embodied in, or can include, the computing system 200 (FIG. 2) for example.

At block 510, the computing system can access a control sequence that directs performance of an automation task involving an automation system and one or more sensor devices. Accessing the control sequence can include accessing a first statement identifying a first sensor device or the one or more sensor devices. The sensor device(s) can be functionally coupled to an automation subsystem contained in the automation system. The automation system can include the automation equipment 112 (FIG. 1A), and the automation subsystem can be embodied in a conveyance subsystem of the conveyance subsystem(s) 114 (FIG. 1A). The sensor device(s) can include at least one of the sensor devices 116 (FIG. 1A). The control sequence can be embodied in one of the control sequences 245 (FIG. 2). In an example scenario, the automation system can be part of an automated dispensing pharmacy, and the automation task can be part of automated fulfillment of a prescription.

At block 520, the computing system can generate respective virtual connections for the one or more sensor devices. The respective virtual connections can be used based on the control sequence. In one example, the sensor device(s) include multiple sensor devices. Thus, the computing system can generate multiple virtual connections in a one-to-one correspondence with those sensor devices. That is, one virtual connection can be generated for each sensor device of the multiple sensor devices. Generating a virtual connection can include storing, at runtime of a software module, a data structure within system memory of the computing system. The data structure can define the virtual connection in terms of a logical address, a unique identifier, and a type attribute identifying the virtual connection as analog sourced or digital sourced. In some cases, the data structure also can include other attributes further defining the virtual connections.

At block 530, the computing system can generate first data by executing the control sequence. The first data represents output signal from at least one of the sensor device(s). Generating the first data can include formatting a first portion of the first data according to a bus protocol. The bus protocol can be any one protocol used to communicate data between a sensor device and a control device within a physical automation system that includes the automation subsystem.

Figure 6:
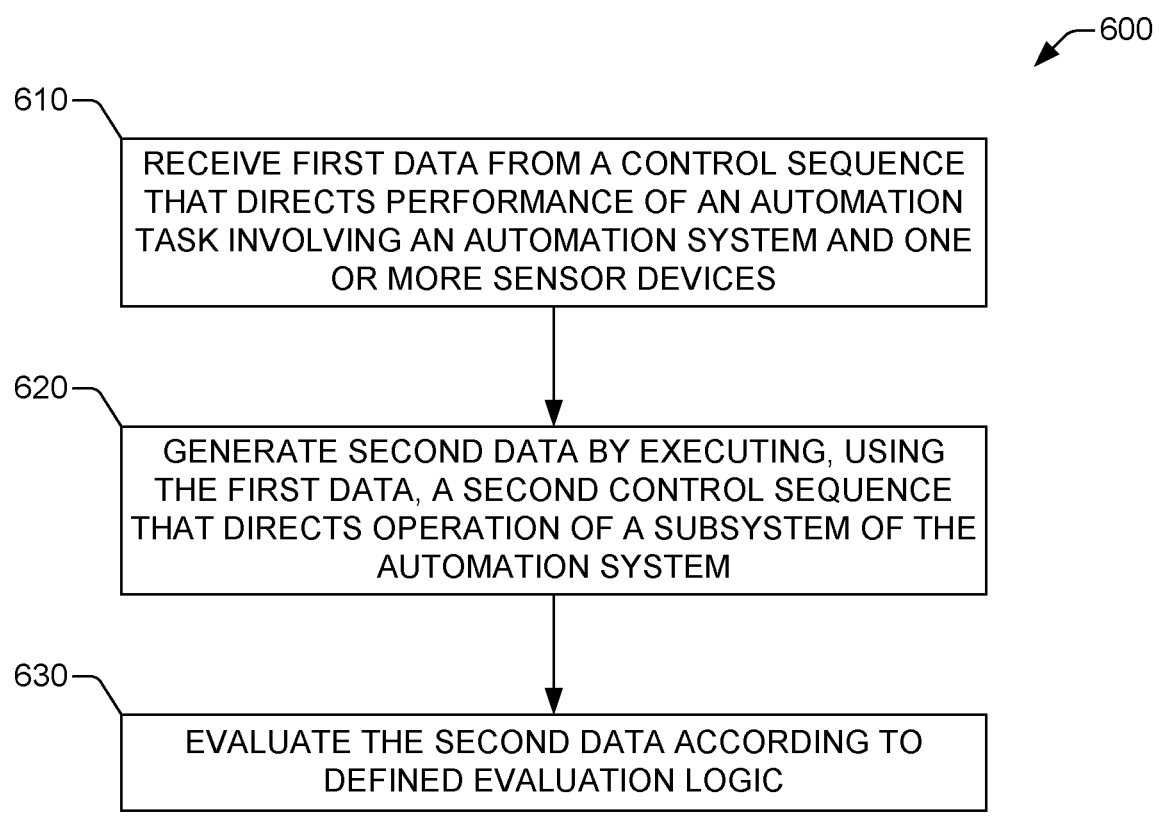
FIG. 6 illustrates an example of a method for evaluating control logic for a conveyance system, in accordance with one or more embodiments of this disclosure.

At block 540, the computing system can pass, using the respective virtual connections, the first data to a second control sequence that directs operation of a conveyance system. The second control sequence can be embodied in the test control sequence 246 (FIG. 2), for example. Passing the first data to the second sequence can include routing the first portion of the first data to a first virtual connection of the respective virtual connections. Additionally, passing the first data to the second sequence can then include sending the first portion of the first data to the second control sequence. The first data can be sent using an API, for example, FIG. 6 illustrates an example of a method 600 for evaluating, using a programmable hardware proxy, control logic for a conveyance system, in accordance with one or more embodiments of this disclosure. The example method 600 can be implemented in combination with the example method 500. A computing system can perform the example method 600 in its entirety or in part. To that end, the computing system includes computing resources that can implement at least one of the blocks included in the example method 600. The computing resources include, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. For instance, the computing system can include programming interface(s); an operating system; software for configuration and or control of a virtualized environment; firmware; and similar resources. In some cases the computing system that implements the example method 600 can be the same as, or can include, the computing system that implements the example method 500. Accordingly, in some cases, the computing system can be embodied in, or can include, the computing system 200 (FIG. 2) for example.

At block 610, the computing system can receive first data from a control sequence that directs performance of an automation task involving an automation system and one or more sensor devices. The first data can be received via virtual connections for respective ones of the sensor device(s). In one example, the control sequence is embodied in one of the control sequences 245 (FIG. 2). The sensor device(s) can be functionally coupled to an automation subsystem contained in the automation system. The automation system can include the automation equipment 112 (FIG. 1A), and the automation subsystem can be embodied in a conveyance subsystem of the conveyance subsystem(s) 114 (FIG. 1A). The sensor device(s) can include at least one of the sensor devices 116 (FIG. 1A).

At block 620, the computing system can generate second data by executing, using the first data, a second control sequence that directs operation of a conveyance system. In one example, the second control sequence is embodied in the test control sequence 246 (FIG. 2).

At block 630, the computing system can evaluate the second data according to defined evaluation logic. Evaluating the second data can include applying the defined evaluation logic to the second data. As is described herein, the evaluation logic can include one or more tests, one or more performance rules, or a combination thereof, for example. Thus, evaluating the second data can include applying a test to the second data. In some cases, evaluating the second data can include generating a score for the second control sequence (e.g., the test control sequence 236 (FIG. 2)), and generating a message including the score and sending that message (an email, for example) to a computing device remotely located relative to the computing system. In addition, or in other cases, evaluating the second data also can include generating, based on the score, a modification to the test control sequence, and implementing the modification or providing a recommendation that the modification be made.

In some embodiments, as a variation of or in addition to the example method 600, the computing system can cause or otherwise direct a computing device to evaluate the second data. The computing device can be remotely located relative to the computing system in some cases.

Figure 7:
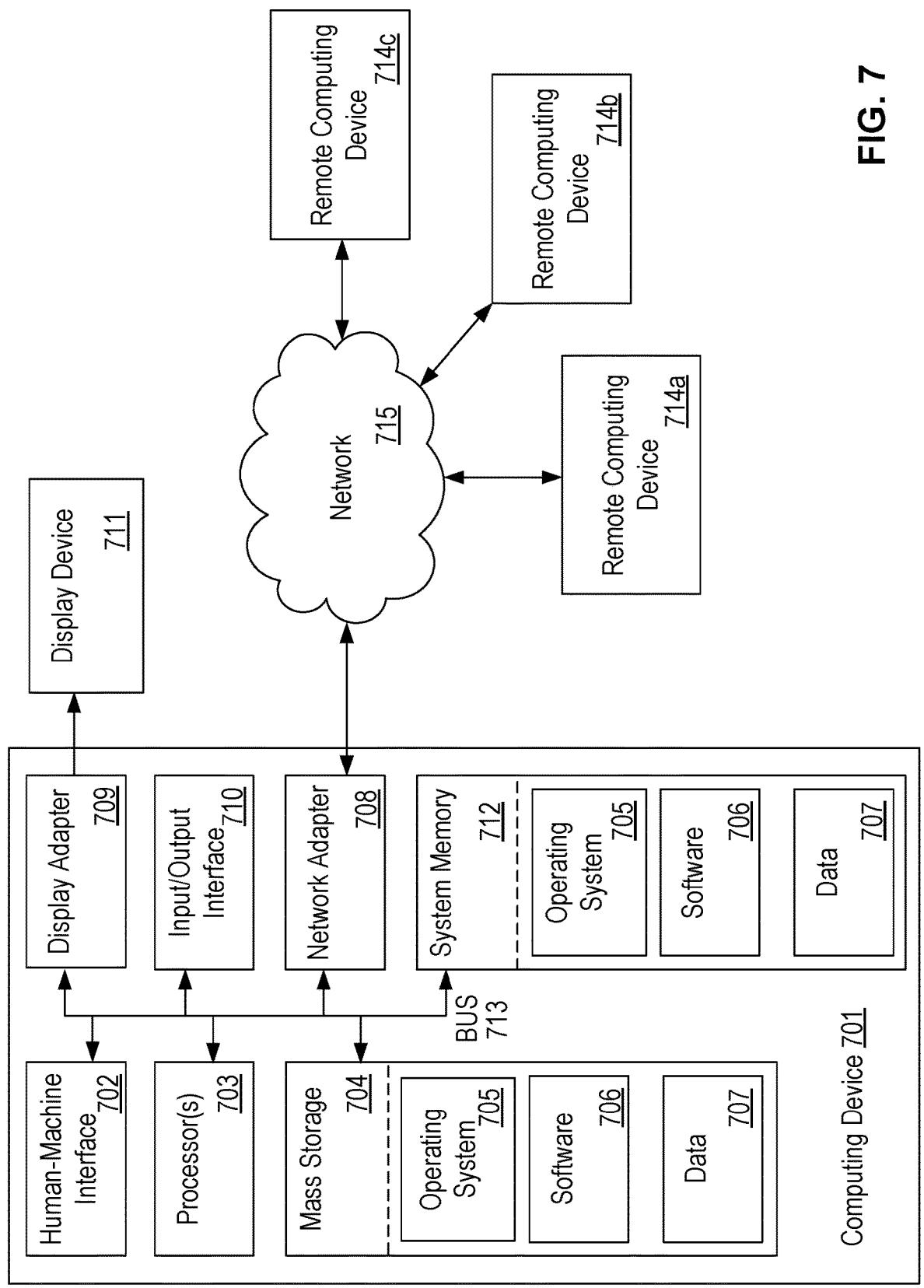
FIG. 7 illustrates an example of a computing system that can implement a programmable hardware proxy, in accordance with one or more embodiments of this disclosure.

In order to provide some context, the computer-implemented methods and systems of this disclosure can be implemented on the computing system illustrated in FIG. 7 and described below. Similarly, the computer-implemented methods and systems disclosed herein can utilize one or more computing devices to perform one or more functions in one or more locations. FIG. 7 is a block diagram illustrating an example of a computing system 700 for performing the disclosed methods and/or implementing the disclosed systems. The computing system 700 shown in FIG. 7 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. The computing system 700 shown in FIG. 7 can embody at least a portion of the computing system 200 (FIG. 2), and can implemented the various functionalities described herein connection with assessment of control logic via a PHP.

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The disclosed systems and computer-implemented methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed computer-implemented methods can also be practiced in grid-based and distributed computing environments where tasks are performed by remote processing devices that are linked through a communications network. In a distributed computing environment, program modules can be located in both local and remote computer storage media including memory storage devices.

Further, the systems and computer-implemented methods disclosed herein can be implemented via a general-purpose computing device in the form of a computing device 701. The components of the computing device 701 can comprise, but are not limited to, one or more processors 703, a system memory 712, and a system bus 713 that functionally couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. The bus 713, and all buses specified in this description can also be implemented over a wired or wireless network connection and each of the subsystems, including the one or more processors 703, one or more mass storage devices 704 (referred to as mass storage 704), an operating system 705, software 706, data 707, a network adapter 708, the system memory 712, an Input/Output Interface 710, a display adapter 709, a display device 711, and a human-machine interface 702, can be contained within one or more remote computing devices 714*a,b,c* at physically separate locations, connected through buses of this form, in effect implementing a fully distributed system.

The computing device 701 typically comprises a variety of computer-readable media. Exemplary readable media can be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the data 707 and/or program modules such as the operating system 705 and the software 706 that are immediately accessible to and/or are presently operated on by the one or more processors 703.

In another aspect, the computing device 701 can also comprise other removable/non-removable, volatile/non-volatile computer storage media. As an example, FIG. 7 illustrates the mass storage 704 which can provide non-volatile storage of computer code, computer readable instructions, data structures, program modules, and other data for the computing device 701. For example and not meant to be limiting, the mass storage 704 can be embodied in, or can include, a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage 704, including by way of example, the operating system 705 and the software 706. Each of the operating system 705 and the software 706 (or some combination thereof) can comprise elements of the programming and the software 706. The software 706 includes the proxy module 232 and the components that form part of the proxy module, such as the intake component 310, the configuration component 320, the format component 330, the router component 340, and the evaluation component 350, for example. The software 706 also includes, in some cases, the conveyor emulator 242. The data 707 can also be stored on the mass storage 704. The data 707 includes the configuration data 244 and the test data 248. The data 707 also includes evaluation logic (e.g., one or more tests, one or more performance rules, and similar). The data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human-machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computing device 701 can have more than one display adapter 709 and the computing device 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computing device 701 via the Input/Output Interface 710. Any operation and/or result of the methods can be output in any form to an output device. Such output can be any form of visual representation, including, but not limited to, textual, graphical, animation, audio, tactile, and the like. The display device 711 and computing device 701 can be part of one device, or separate devices.

The computing device 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computing device 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. In an aspect, one or more of the remote computing devices 714a,b,c can comprise an external engine and/or an interface to the external engine.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the software 706 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is to be understood that the computer-implemented methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth:

"comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The methods and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computing system, comprising:
   at least one processor; and
   at least one memory device having processor-executable instructions stored thereon that, in response to execution by the at least one processor, cause the computing system to:
      access a control sequence that directs execution of an automation task involving an automation system and one or more sensor devices functionally coupled to an automation subsystem of the automation system;
      generate, based on the control sequence, respective virtual connections for the one or more sensor devices;
      generate first data by executing the control sequence, the first data representing output signal from at least one sensor device of the one or more sensor devices; and
      pass the first data to a second control sequence that directs operation of the automation subsystem.

2. The computing system of claim 1, wherein accessing the control sequence comprises accessing a first statement identifying a first sensor device or the one or more sensor devices.

3. The computing system of claim 1, wherein generating the respective virtual connections comprises storing, at runtime of a software module, a data structure within system memory of a computing system, wherein the data structure defines a virtual connection of the respective virtual connections.

4. The computing system of claim 1, wherein generating the first data comprises formatting a first portion of the first data according to a bus protocol pertaining to the automation system.

5. The computing system of claim 4, wherein passing the first data comprises routing the first portion of the first data to a first virtual connection of the respective virtual connections.

6. The computing system of claim 5, wherein passing the first data further comprises sending, using an application programming interface (API), the first portion of the first data to the second control sequence.

7. The computing system of claim 1, the at least one memory device having further processor-executable instructions stored thereon that in response to execution by the at least one processor further cause the computing system to generate second data by executing, using the first data, the second control sequence.

8. The computing system of claim 7, the at least one memory device having further processor-executable instructions stored thereon that in response to execution by the at least one processor further cause the computing system to configure evaluation logic to generate a message and a score, wherein the evaluation logic is stored in the at least one memory device.

9. The computing system of claim 1, the at least one memory device having further processor-executable instructions stored thereon that in response to execution by the at least one processor further cause the computing system to,
   access a third control sequence that directs execution of a second automation task involving the automation system and one or more second sensor devices functionally coupled to a second automation subsystem of the automation system;
   generate, based on the second control sequence, respective second virtual connections for the one or more second sensor devices;
   generate third data by executing the second control sequence, the third data representing output signal from at least one sensor device of the one or more second sensor devices; and
   pass the third data to third second control sequence that directs operation of the second automation subsystem.

10. The computing system of claim 9, the at least one memory device having further processor-executable instructions stored thereon that in response to execution by the at least one processor further cause the computing system to generate fourth data by executing, using the third data, the second control sequence.

11. The computing system of claim 1, wherein the one or more sensor devices comprise at least one of a photodetector device, a label reader device or a diverter device.

12. The computing system of claim 1, wherein the automation subsystem comprises a conveyance system.

13. A computer-implemented method comprising:
    accessing a control sequence that directs execution of an automation task involving an automation system and one or more sensor devices functionally coupled to an automation subsystem of the automation system;
    generating, based on the control sequence, respective virtual connections for the one or more sensor devices;
    generating first data by executing the control sequence, the first data representing output signal from at least one sensor device of the one or more sensor devices; and
    passing the first data to a second control sequence that directs operation of the automation subsystem.

14. The computer-implemented method of claim 13, wherein the generating the first data comprises formatting a first portion of the first data according to a bus protocol pertaining to the automation system.

15. The computer-implemented method of claim 14, wherein the passing the first data comprises routing the first portion of the first data to a first virtual connection of the respective virtual connections.

16. The computer-implemented method of claim 13, further comprising generating second data by executing, using the first data, the second control sequence.

17. The computer-implemented method of claim 16, further comprising configuring evaluation logic to generate a message and a score, wherein the evaluation logic is stored in the at least one memory device.

18. At least one computer-readable non-transitory storage medium having processor-executable instructions stored thereon that, in response to execution, cause a computing system to:
    access a control sequence that directs execution of an automation task involving an automation system and one or more sensor devices functionally coupled to an automation subsystem of the automation system;
    generate, based on the control sequence, respective virtual connections for the one or more sensor devices;

generate first data by executing the control sequence, the first data representing output signal from at least one sensor device of the one or more sensor devices; and pass the first data to a second control sequence that directs operation of the automation subsystem.

19. The at least one computer-readable non-transitory storage medium of claim 18, wherein the processor-executable instructions, in response to further execution, further cause the computing system to generate second data by executing, using the first data, the second control sequence.

20. The at least one computer-readable non-transitory storage medium of claim 18, wherein the processor-executable instructions, in response to further execution, further cause the computing system to configure evaluation logic to generate a message and a score, wherein the evaluation logic is stored in the at least one memory device.

* * * * *